United States Patent Office 2,853,461
Patented Sept. 23, 1958

2,853,461

CERAMIC BINDER COMPRISING A NITROGEN CONTAINING SALT OF A SYNTHETIC RESIN

John J. Padbury, Springdale, and George Sidney Sprague, Stamford, Conn., assignors to American Cyanamid Company, New York, N. Y., a corporation of Maine No Drawing. Application March 13, 1953
Serial No. 342,279

5 Claims. (Cl. 260—41)

This invention relates to ceramic binders. More particularly this invention relates to the production of ceramic bodies and the utilization of certain organic additives as binders therefor.

In the prior art many materials have been employed as binders in the production of ceramic bodies. In the usual method of production the ceramic mix is combined with the binder and the desired object shaped and fired. It has been found that the binders now available do not possess all of the properties desired when employed. Certain halogenated organic additives have been utilized but have been found to be unsatisfactory in that they are toxic and react with ceramics containing barium, e. g. barium titanate. Other organic binders have been found to diffuse to the surface of the ceramic mix during drying. Perhaps the greatest disadvantage of the present organic additives is the tendency of the material to carbonize during the firing period. Carbon once formed is difficult to burn out and imparts undesirable features to the finished ceramic body. Alkali metal salts of certain organic additives have been found effective when used as the water-soluble salt of said additive and furthermore give improved plasticity to the mixture and improved green and dry strength. However, during the firing of the ceramic body the alkali metal, such as sodium, remains in the fired product and the electrical properties of said product are degraded.

It is an object of this invention to employ as a ceramic binder an organic additive that improves the plasticity of the mixture as well as the green and dry strength. It is a further object of this invention to employ as the ceramic body a material which burns out readily and completely. An additional object of this invention is to produce a ceramic body employing as the binder a non-toxic material. These and other objects of our invention will be discussed more fully hereinbelow.

In the production of ceramic white ware, about 90% of all bodies formed are triaxial, i. e., consist of three components. These components of the ceramic mix are clay, flint and feldspar. Occasionally secondary fluxes such as lime and magnesia in small amounts are utilized. The so-called nontriaxial mixes contain other components such as barium titanate, ceramic grade rutile, talc, bone ash, pyrophyllite and alumina. After the ceramic body has been formed, it is fired in either a continuous process as in a tunnel kiln or in a batch kiln. The so-called porcelain process develops the glaze and body in the same firing process whereas two or more firings are required to produce the final product in the china process. If desired, decorative coatings may be sprayed onto the ceramic body between firings in the china process. After the firing process, the ceramic bodies are classified as either vitreous, the water absorption of which is less than 0.2%, and semi-vitreous, the water absorption of which is greater than 0.2%.

The temperatures employed during the firing of the ceramic body may vary from about 1200° C. to about 1500° C. It is conventional to employ Seger cones to control the temperature of firing of the bodies. The firing time will vary as the firing temperature varies. At lower temperatures such as 1200° C. a firing time as long as 100 minutes may be required, whereas at temperatures in the order of 1500° C. firing times as short as from 5 to 10 minutes is usually sufficient to form the finished product.

In the formation of the ceramic body various methods may be employed such as jiggering, extrusion, casting or pressing. The ceramic mix is first mixed in a suitable mixer with water containing the ceramic binder with the amount of water employed governed by the particular method used to form the ceramic body. In the casting process a slurry of the ceramic mix containing from 25 to 50% water is cast into plaster of Paris molds. After the mix has been dried, it is then fired. When the jiggering process is employed, a plastic mud of the ceramic mix containing approximately 20 to 25% water is satisfactory. Here the product is formed on a turntable and then fired. For the extrusion process a plastic ceramic mix containing from 15 to 30% water is extruded, dried and turned to shape prior to firing. In the pressing operation a granulated ceramic mix is pressed in steel molds. When the dry press process is employed, the mix contains about 15% to 17% water and the dust press process contains water in the amount of about 8% to 10%. If desired, a water content of less than 2% can be employed in the dry process.

The raw materials which find use in the ceramic mix are clay ($H_4Al_2Si_2O_9$) which is iron free and does not have excessive shrinkage on drying and firing. The average particle size of the clay is about 14.3 to about 1.7 microns. Flint employed is prepared from quartz rock, sand or sand rock containing greater than 98% $SiO_2$ and has an average particle size of about 8.3 to about 2.5 microns. Feldspar ($KAlSi_3O_8$) employed in the mix has an average particle size of from about 8.3 to about 2.5 microns. When other materials are used in the ceramic mix to form nontriaxial bodies, the particle size of the particular component will be of a size comparable to that of the clay, flint and feldspar.

We have found that a water-soluble volatilizable nitrogen containing salt of a polymer of a monoethylenically unsaturated compound may be employed as ceramic binders. The water-soluble volatilizable nitrogen containing salt of these copolymers have the desired properties of being completely and readily volatilized during the firing of the ceramic mix. Also, these binders impart to the ceramic mixture improved plasticity and improved green and dry strength. The improvement in the dry strength of the material is particularly desirable when the body is being turned to desired shape after having been extruded in the extrusion process. The binder herein employed is also nontoxic. From about 1% to about 5% by weight of the additive based on the total weight of the ceramic mix has been found to be effective when utilized as a ceramic binder.

The ultimate use of the ceramic body will determine the composition of the ceramic mix. For example, chemical porcelain may contain about 80% to 75% clay, about 8% to 13% feldspar and about 8% to 13% flint. For high tension electrical porcelain the composition of the ceramic mix may vary as follows: clay about 45% to 55%; feldspar, about 25% to 40%; and flint, about 15% to 20%. A satisfactory mix for sanitary ware has been found to be: clay, about 50% to 55%; feldspar, about 27% to 35%; and flint, about 15% to 18%. A typical nontriaxial mix such as that employed in the production of wall tile is: talc, about 60% to 80%; clay, about 2% to 22%; feldspar, about 2% to 4%; and flint, about 12% to 17%. The amount of water used to form the plastic mix or mud will, as set forth above, vary depending upon the particular process used to form the ceramic body. This water will contain dissolved therein the ceramic binder so that from about 1% to about 5% by weight of the binder based on the total weight of the ceramic mix will be present in the pre-fired shaped article.

The water-soluble volatilizable nitrogen containing salt of a polymer of a monoethylenically unsaturated compound is a salt of a polymer having molecular weight of at least 10,000 which contains a substantially continuous linear carbon chain derived from the polymerization of an aliphatic unsaturated group. There is no theoretical upper limit on the molecular weight of the polymer. However, practical problems of preparation and handling will impose a limit. Accordingly, a polymer having a molecular weight above 500,000 becomes difficult to handle and polymers having a higher molecular weight are not usually employed in our invention. The polymer used in our invention may be obtained by the equimolar copolymerization of a polycarboxylic acid derivative and at least one other monomer copolymerizable therewith. Examples of the polycarboxylic acid derivatives are maleic anhydride, maleic acid, fumaric acid, itaconic acid, aconitic acid, ammonium salts of these acids, alkanolamine salts of these acids, guanidinium salts of these acids, aliphatic amine salts of these acids and the like. The monomers copolymerizable with the polycarboxylic acid derivative are such as ethylene, propylene, isobutylene, styrene, side-chain and nuclear substituted styrene, e. g., alpha methylstyrene, o-, m-, and p-methylstyrenes and mixtures thereof, alkyl acrylates, alkyl methacrylates, and vinyl derivatives such as vinyl acetate, vinyl formate, vinyl alkyl ethers, etc.

If desired, any of the polycarboxylic acid derivatives may be copolymerized with any of the monomers above set forth and any other that forms a copolymer with said acid derivative in equimolar proportions. The acid derivative may also be copolymerized with a plurality of co-monomers when the total molar proportion of the monomer is equimolar with respect to the polycarboxylic acid derivative. The polymer utilized in our invention may also be the polymers of acrylic or methacrylic acid derivatives, for example, the ammonium salt, guanidinium salts, alkanolamine salts, aliphatic amine salts of acrylic or methacrylic acid. The polymers may be homopolymers or they may be copolymers of an acrylic acid derivative with a monomeric material as for example ethylene, propylene, isobutylene, side-chain and nuclear ubstituted styrenes, e. g., alpha methylstyrene, alkyl acrylates, alkyl methacrylates, and vinyl derivatives such as vinyl acetate, vinyl formate, vinyl alkyl ethers, etc., and acrylonitrile, methacrylonitrile and the like. The copolymers of the acrylic or methacrylic acid derivatives do not require equimolar proportion of the acrylic or methacrylic acid derivatives. For example, the copolymer may contain from 2% to 98% of the acrylic or methacrylic acid derivative depending upon the monomeric material with which it is polymerized.

The water-soluble volatilizable nitrogen containing salt of the polymer may be prepared by neutralization of the polymer after its formation or the salt of the acid may first be formed and then the polymer produced. The compounds which may be utilized to form the water-soluble volatilizable nitrogen containing salt are, for example, ammonia, the guanidinium salts, e. g., guanidinium chloride, guanidinium carbonate, guanidinium nitrate, etc., the alkanolamines, e. g., monoethanolamine, diethanolamine, triethanolamine, monopropanolamine, dipropanolamine and tripropanolamine, etc., the aliphatic amines, e. g., methylamine, ethylamine, propylamine butylamine, amylamine, etc. The amount of nitrogen containing compound utilized is such that the monomer or the acid derivative used in the production of the polymer is substantially neutralized.

In order that those skilled in the art may more fully understand the inventive concept herein disclosed the following examples of water-soluble volatilizable nitrogen containing salts of polymers of a monoethylenically unsaturated compound are set forth. All parts given are parts by weight and should not be considered critical unless otherwise noted in the appended claims.

CERAMIC BINDERS (1) Four (4) parts of a 4% solution in water of polyacrylic acid having a specific viscosity of 8.3 was dissolved in 196 parts of water containing 5.6 parts of concentrated aqueous ammonia to form ammonium polyacrylate.

(2) One (1) part of a styrene-maleic anhydride copolymer was dissolved in 50 parts of a solution containing 0.65 part of concentrated ammonia solution to produce a styrene-ammonium maleate copolymer.

(3) Two (2) parts of a vinyl acetate-N-butyl maleamic acid copolymer, 1% in cyclohexanone having a specific viscosity of 2.1, was dissolved in anhydrous dioxane. Butylamine was dissolved in the solution and a precipitate separated. The dioxane was decanted and the precipitate produced, vinyl acetate-N-butylmaleamic butylamine salt copolymer, was washed with absolute ether.

(4) Two (2) parts of a copolymer of vinyl acetate-maleic anhydride, 1% in cyclohexanone having a specific viscosity of 2.1, was dissolved in 100 parts of a solution containing 1.6 parts of triethanolamine to form the triethanolamine salt of vinyl acetate-maleic anhydride copolymer.

(5) Four (4) parts of a copolymer of 50/50 acrylamide-acrylic acid, 0.4% in water having a specific viscosity of 0.46, was dissolved in 196 parts of water containing 1.8 parts of concentrated ammonia to form the ammonium salt.

(6) One (1) part of a copolymer of 50/50 acrylamide-methacrylic acid, 0.4% in water having a specific viscosity of 2.3, was dissolved in 49 parts of water containing 0.5 part of concentrated ammonia to form the ammonium salt.

(7) Four (4) parts of a copolymer of vinyl acetate-maleic anhydride, 1% in cyclohexanone having a specific viscosity of 2.1, was dissolved in 200 parts of a solution containing 2.9 parts of ammonia to form the ammonium salt.

(8) Four (4) parts of vinyl acetate-maleic anhydride copolymer, 1% in cyclohexanone having a specific viscosity of 2.1, was dissolved in anhydrous dioxane. Anhydrous ammonia gas was passed into the solution until a precipitate formed which was the ammonium salt. The dioxane was then decanted and the precipitate washed with absolute ether.

(9) Four (4) parts of a copolymer of vinyl methyl ether-maleic anhydride, 1% in cyclohexanone having a specific viscosity of 13.8, was dissolved in 200 parts of solution containing 3.4 parts of ammonia to form the ammonium salt.

(10) Four (4) parts of a copolymer of vinyl acetate-maleic anhydride, 1% in cyclohexanone having a specific viscosity of 4.75 was dissolved in 200 parts of solution containing 2.9 parts of an ammonia to form the ammonium salt.

(11) Four (4) parts of a copolymer of isopropenyl acetate-maleic anhydride, 1% in cyclohexanone having a specific viscosity of 19.3, was dissolved in 200 parts of solution containing 2.7 parts of ammonia to form the ammonium salt.

(12) Four (4) parts of a copolymer of ethyl acrylate-maleic anhydride was dissolved in 200 parts of a solution containing 2.6 parts of ammonia to form the ammonium salt.

(13) Four (4) parts of a copolymer of isobutylene-maleic anhydride, 0.2% in dimethyl formamide having a specific viscosity of 0.83, was dissolved in 200 parts of a solution containing 3.4 parts of ammonium to produce the ammonium salt.

(14) Four (4) parts of a copolymer of 50/50 acrylonitrile-methacrylic acid was added to a solution containing 100 parts of concentrated sulfuric acid and 30 parts of water. The thick solution was diluted with water and heated to separate the polymer which was dried and dissolved in 200 parts of solution containing 2 parts of ammonia solution to form the ammonium salt.

(15) Fifty (50) parts of a 75/25 acrylonitrile-methyl acrylate copolymer was heated in an autoclave at 150° C. for 2 hours with 200 mls. of concentrated ammonium hydroxide to obtain the water-soluble ammonium salt.

(16) Four (4) parts of a styrene-methacrylic acid copolymer was dissolved in 200 parts of solution containing ammonia to form the ammonium salt.

The ceramic binders prepared as set forth above were then employed as will be discussed hereinbelow. The examples set forth are merely for purposes of illustration and should not be considered critical unless otherwise noted in the appended claims.

*Example 1*

In order to determine the adaptability of a binder for use in the extrusion process a mixture of the ceramic mix is placed in a 1-inch diameter slug die with clearance of 0.001 inch and is subjected to a pressure of 5,000 p. s. i. If the binder is suitable for extrusion, a thin film of ceramic will come through the clearance. If water only is squeezed, the binder is unsatisfactory.

A mixture of 55 parts of clay, 22.5 parts of feldspar, 22.5 parts of silica and 4 parts of ammonium polyacrylate as a 25% solution in water was thoroughly mixed with sufficient additional water to form a doughlike mass. This mixture was placed in the 1-inch diameter slug die and subjected to a pressure of 5,000 p. s. i. A thin film of the ceramic extrudes from the die as a result of this pressure. A similar composition omitting the ammonium polyacrylate extrudes water when it is subjected to pressure, a behavior which makes it unacceptable for extrusion.

*Example 2*

A composition identical with that of Example 1 except that 4 parts of the guanidinium salt of 50/50 acrylonitrile-acrylic acid copolymer was substituted for the ammonium polyacrylate was prepared. This composition was satisfactory in the pressure test.

*Example 3*

A mixture of 100 parts of titanium dioxide and 4 parts of ammonium polyacrylate and sufficient water to permit processing was extruded in the form of a rod through a 3/16 inch die. This composition extruded easily and the rod had excellent strength before and after oven firing. The electrical insulating characteristics of the fired piece were excellent whereas a similar rod prepared using sodium polyacrylate as the binder was unsatisfactory, particularly after aging.

*Example 4*

A slurry containing 55% clay, 30% feldspar and 15% flint was prepared in water containing the ammonium salt of styrene-maleic anhydride copolymer. The amount of water employed was adjusted so that the mix contained about 25% by weight of water. The ceramic binder was dissolved in the water so that 3% by weight based on the dry weight of the ceramic mix was present. An article was cast, dried and fired in the usual manner. On examination of the fired article, it was found that the ammonium salt of the copolymer of styrene-maleic anhydride copolymer was completely removed. When the ammonium salt of the copolymer of acrylic acid-acrylonitrile was substituted as the binder in the above formulation, examination of the fired article also disclosed the complete burning out of the binder.

We claim:

1. An unburnt ceramic material of improved plasticity possessing a high green strength which comprises a major portion of finely divided ceramic material and from about 1% to about 5% by weight based on the total weight of the mixture of a water-soluble, volatilizable nitrogen containing salt of a polymer selected from the group consisting of homopolymers of acrylic acid and methacrylic acid and copolymers of maleic anhydride, maleic acid, fumaric acid, itaconic acid, aconitic acid, acrylic acid and methacrylic acid and at least one other monomer copolymerizable therewith.

2. An unburnt ceramic material of improved plasticity possessing a high green strength which comprises a major portion of finely divided ceramic material and from about 1% to about 5% by weight based on the total weight of the mixture of an ammonium salt of styrene-maleic anhydride copolymer.

3. An unburnt ceramic material of improved plasticity possessing a high green strength which comprises a major portion of finely divided ceramic material and from about 1% to about 5% by weight based on the total weight of the mixture of an ammonium salt of acrylic acid-acrylonitrile copolymer.

4. An unburnt ceramic material of improved plasticity possessing a high green strength which comprises a major portion of finely divided ceramic material and from about 1% to about 5% by weight based on the total weight of the mixture of a guanidinium salt of acrylonitrile-acrylic acid copolymer.

5. An unburnt ceramic material of improved plasticity possessing a high green strength which comprises a major portion of finely divided ceramic material and from about 1% to about 5% by weight based on the total weight of the mixture of an ammonium salt of polyacrylic acid.

References Cited in the file of this patent

UNITED STATES PATENTS

| | | |
|---|---|---|
| 2,136,404 | Wheeler | Nov. 15, 1938 |
| 2,288,047 | Sullivan | June 30, 1942 |
| 2,519,280 | Potter | Aug. 15, 1950 |
| 2,607,762 | Bowen | Aug. 19, 1952 |
| 2,625,529 | Hedrick | Jan. 13, 1953 |

FOREIGN PATENTS

| | | |
|---|---|---|
| 586,903 | Great Britain | Apr. 3, 1947 |